(12) United States Patent
Campbell

(10) Patent No.: US 10,642,568 B2
(45) Date of Patent: May 5, 2020

(54) PROJECTOR AND ELECTRONIC INK DISPLAY

(71) Applicant: Hewlett-Packard Development Company, L.P., Houston, TX (US)

(72) Inventor: Robert Campbell, Cupertino, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/762,041

(22) PCT Filed: Jan. 6, 2016

(86) PCT No.: PCT/US2016/012275
§ 371 (c)(1),
(2) Date: Mar. 21, 2018

(87) PCT Pub. No.: WO2017/119872
PCT Pub. Date: Jul. 13, 2017

(65) Prior Publication Data
US 2018/0285046 A1    Oct. 4, 2018

(51) Int. Cl.
*G06F 3/147*     (2006.01)
*H04N 21/41*    (2011.01)
*H04N 9/31*      (2006.01)
*G02F 1/167*    (2019.01)
*G09G 3/34*      (2006.01)
(Continued)

(52) U.S. Cl.
CPC .............. *G06F 3/147* (2013.01); *G02F 1/167* (2013.01); *G03B 21/56* (2013.01); *G09G 3/002* (2013.01); *G09G 3/34* (2013.01); *G09G 3/3433* (2013.01); *H04N 9/3179* (2013.01); *H04N 9/3185* (2013.01); *H04N 21/4122* (2013.01); *G06F 3/1423* (2013.01); *G09G 3/344* (2013.01); *G09G 2340/12* (2013.01); *G09G 2360/04* (2013.01)

(58) Field of Classification Search
CPC ........ G06F 3/147; G06F 3/1423; G06F 1/167; G03B 21/56; G09G 3/002; G09G 3/34; G09G 3/3433; G09G 3/344; G09G 2340/12; G09G 2360/04; H04N 9/3179; H04N 9/3185; H04N 21/4122
USPC ........................................................ 345/3.1
See application file for complete search history.

(56) References Cited

U.S. PATENT DOCUMENTS 7,699,476 B2    4/2010   Denoue et al.
7,839,568 B2   11/2010   Wen et al.
(Continued)

FOREIGN PATENT DOCUMENTS

JP         2008032925 A     2/2008
WO    WO-2013159093 A1   10/2013

OTHER PUBLICATIONS

Kinjo, Tsukasa et al. "Vivid image projection system using ePaper active screen." Journal of the Society for Information Display 20, No. 10 (2012): 559-565.

*Primary Examiner* — Mark Edwards
(74) *Attorney, Agent, or Firm* — HP Inc. Patent Department

(57) ABSTRACT

Example implementations relate to a projector and an electronic ink display. For example, a system may include an electronic ink display device and a projector device. The electronic ink display device may display first content, and the projector device may project second content onto the electronic ink display device such that the second content is overlaid on the first content.

15 Claims, 3 Drawing Sheets

(51) Int. Cl.
*G03B 21/56* (2006.01)
*G09G 3/00* (2006.01)
*G06F 3/14* (2006.01)

(56) References Cited

U.S. PATENT DOCUMENTS

| | | |
|---|---|---|
| 8,382,295 B1 * | 2/2013 | Kim .................. H04N 9/31 348/552 |
| 2005/0057803 A1 | 3/2005 | Cruz-Uribe et al. |
| 2006/0038743 A1 | 2/2006 | Cambron |
| 2013/0100495 A1 | 4/2013 | Akiba |
| 2013/0278900 A1 * | 10/2013 | Hertel .................. G03B 21/14 353/28 |
| 2014/0049808 A1 | 2/2014 | Yang |
| 2014/0104431 A1 | 4/2014 | Eikenes et al. |
| 2014/0368447 A1 | 12/2014 | Saini |
| 2015/0165965 A1 * | 6/2015 | Masaki ............ B32B 17/10036 362/513 |

\* cited by examiner

PROJECTOR AND ELECTRONIC INK DISPLAY

BACKGROUND

A projector may be used to display content onto a surface. For example, a projector may project an image onto a white wall in order to display the image in an enlarged view.

BRIEF DESCRIPTION OF THE DRAWINGS

Some examples of the present application are described with respect to the following figures.

DETAILED DESCRIPTION

As described above, a projector may be used to display content onto a surface. Some projector devices may be powered by plugging the projector device into a power outlet, while other projector devices may be battery-powered. An example of a battery-powered projector device is a pico projector device, which is a handheld projector device. Because these types of projectors are battery-powered, energy consumption may be a concern.

Examples discussed herein may allow content from a projector device to be displayed on an electronic ink (e-ink) display device, such that a portion of the content is displayed by the e-ink display device while the remainder of the content is projected onto the e-ink display device by the projector device. An e-ink display device may refer to any suitable display device that mimics the appearance of ink on paper and that reflects light like paper, making content that is displayed by the e-ink display device more comfortable to read while consuming less power during operation. A projector device may refer to any suitable optical device capable of projecting content onto a surface. The content that may be displayed by the e-ink display device and the projector device may include any suitable content capable of being displayed by an e-ink display device and a projector device, such as an image, a video, and the like.

A processor may coordinate the display of the content by, determining which portion of the content is to be displayed by the e-ink display device and which portion of the content is to be projected onto the e-ink display device by the projector. The processor may send the determined portion to the respective device such that each device may present the content accordingly. For example, the content to be displayed may be a background setting with a figure in the foreground. In this case, the processor may send the background setting of the content to the e-ink display device for the e-ink display device to display, and the processor may send the figure in the foreground of the content to the projector device for the projector to project onto the e-ink display device such that the projector content (e.g., the figure in the foreground) is overlaid on the e-ink display device content (e.g., the background).

Figure 1:
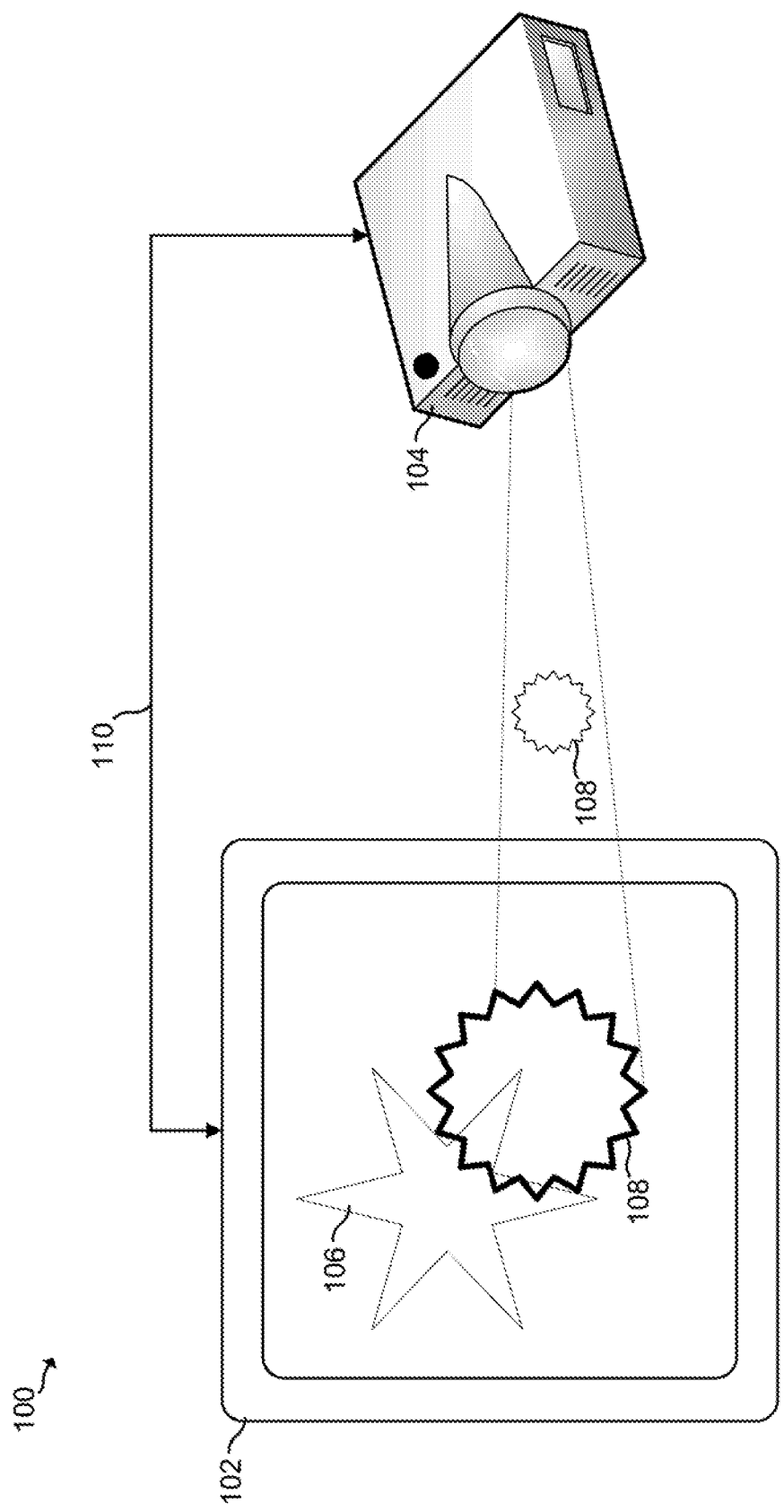
FIG. 1 illustrates an example system having a projector device and an electronic ink display device, where the projector device projects content onto the electronic ink display device that is also displaying content.

Referring now to the figures, FIG. 1 illustrates an example system 100 having a projector device 104 and an e-ink display device 102, where the projector device 104 projects content 108 onto the e-ink display device 102 that is also displaying content 106. As described above, the e-ink display device 102 may be any suitable display device that mimics the appearance of ink on paper and that reflects light like paper, making content that is displayed by the e-ink display device more comfortable to read while consuming less power during operation. The projector device 104 may refer to any suitable optical device capable of projecting content onto a surface, such as the e-ink display device 102 surface.

For example, the e-ink display device 102 may display content 106, and the projector device 104 may project content 108 onto the e-ink display device 102 such that the content 108 is overlaid on the content 106. The content 106 may be associated with the content 108 in any suitable manner. For example, the content 106 may serve as a background image while the content 108 may serve as a foreground image to be overlaid on the content 106.

The e-ink display device 102 and the projector device 104 may be in communication with each other via any suitable connection 110, such as, through a wireless connection (e.g., Bluetooth, etc.) or through a wired connection (e.g., Universal Serial Bus). The e-ink display device 102 and the projector device 104 may be in communication with each other such that the content presented by the devices may be coordinated with each other. In some examples, a processor in communication with the e-ink display device 102 and the projector device may manage the coordination of the content between the devices. For example, a processor in communication with the e-ink display device 102 and the projector device 104 may send the content 106 to the e-ink display device 102 and may send the content 108 to the projector device 104 such that each respective device may present their respective content accordingly.

In some examples, the e-ink display device 102 and the projector device 104 may be separate devices that may be operated in conjunction through the connection 110. For example, the projector device 104 may include a camera device to sense and/or detect the relative positions of the projector device 104 and the e-ink display device 102 in order to align the content displayed from the projector device 104 onto the e-ink display device 102. In other examples, the e-ink display device 102, the projector device 104, and the connection 110 may be included in one device and/or within one housing unit.

In some examples, when the e-ink display device 102 and the projector device 104 are being operated in a dark or dimly-lit environment, the projector device 104 may project white light onto the e-ink display device 102 to, make the e-ink display device more readable in the dark or dimly-lit environment.

Figure 2:
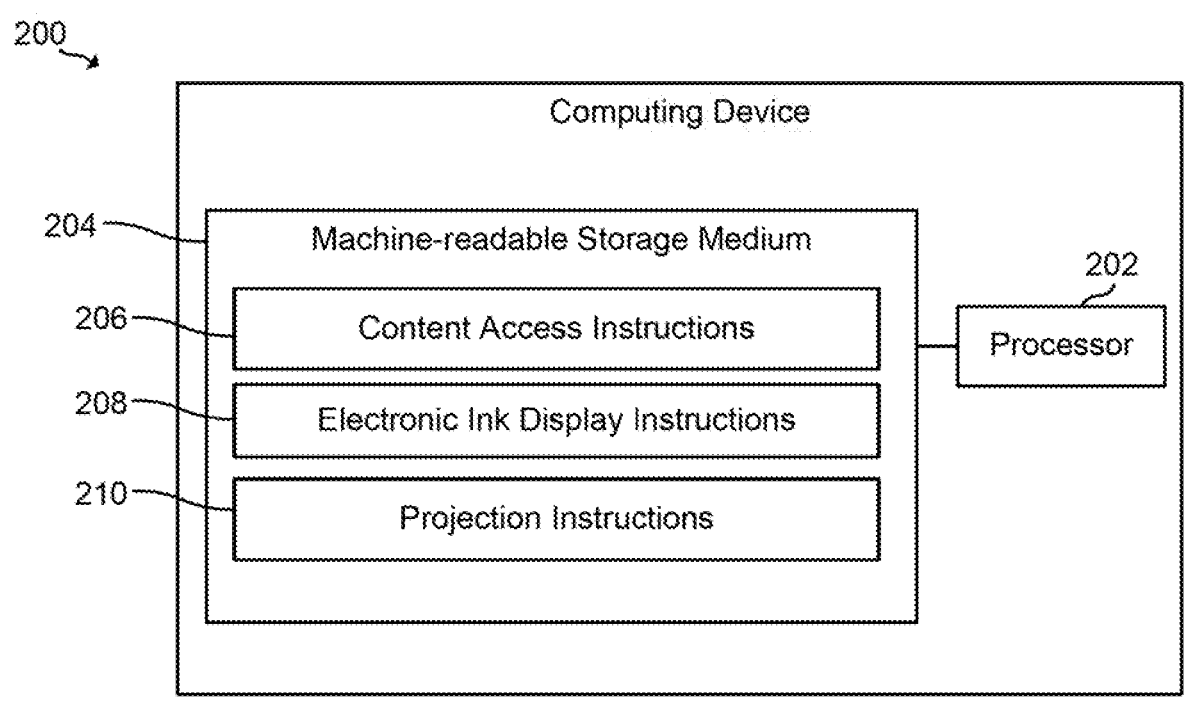
FIG. 2 is a block diagram of an example computing device for providing a portion of content to be displayed by an electronic ink display device and another portion of the content to be displayed by a projector device.

FIG. 2 is a block diagram of an example computing device 200 for providing a portion of content to be displayed by an e-ink display device and another portion of the content to be displayed by a projector device. Computing device 200 may be any suitable computing device in communication with an e-ink display device (e.g., e-ink display device 102 of FIG. 1) and a projector device (e.g., projector device 104 of FIG. 1).

Computing device 200 may be, for example, a web-based server, a local area network server, a cloud-based server, a notebook computer, a desktop computer, an all-in-one system, a tablet computing device, a mobile phone, an electronic book reader, a printing device, or any other electronic device suitable for providing a portion of content to be displayed by an e-ink display device and another portion of the content to be displayed by a projector device. Computing device 200 may include a processor 202 and a machine-readable storage medium 204. Computing device 200 may allow the coordination of a display of content on an e-ink display device and a projector device.

Processor 202 is a tangible hardware component that may be a CPU, a semiconductor-based microprocessor, and/or other hardware devices suitable for retrieval and execution of instructions stored in machine-readable storage medium 204. Processor 202 may fetch, decode, and execute instructions 206, 208, and 210 to control a process of providing a portion of content to be displayed by an e-ink display device and another portion of the content to be displayed by a projector device. As an alternative or in addition to retrieving and executing instructions, processor 202 may include at least one electronic circuit that includes electronic components for performing the functionality of instructions 206, 208, 210, or a combination thereof.

Machine-readable storage medium 204 may be any electronic, magnetic, optical, or other physical storage device that contains or stores executable instructions. Thus, machine-readable storage medium 204 may be, for example, Random Access Memory (RAM), an EPROM, an Electrically Erasable Programmable Read-Only Memory (EEPROM), a storage device, an optical disc, and the like. In some examples, machine-readable storage medium 204 may be a non-transitory storage medium, where the term "non-transitory" does not encompass transitory propagating signals. As described in detail below, machine-readable storage medium 204 may be encoded with a series of processor executable instructions 206, 208, and 210 for accessing content to be displayed on an e-ink display device; sending a first portion of the content to the e-ink display device, where the e-ink display device is to display the first portion; and sending a second portion of the content to a projector device, where the projector device is to project the second portion onto the e-ink display device such that the second portion is overlaid on the first portion.

Content access instructions 206 may manage and control the accessing of content to be displayed on the e-ink display device by the e-ink display device and the projector device. The content access instructions 206 may access the content from any suitable source, such as from a source accessible over a network (e.g., the Internet), from a memory of the computing device 200, and the like.

E-ink display instructions 208 may manage and control the determination, identification, and the sending of a portion of the content to the e-ink display device. For example, e-ink display instructions 208 may use the accessed content to determine and identify which portion of that content is to be displayed by the e-ink display device, and, based on that determination, the identified portion of the content may be sent to the e-ink display device.

Projection instructions 210 may manage and control the determination, identification, and the sending of a portion of the content to the projector device. For example, the projection instructions 210 may use the accessed content to determine and identify which portion of the content is to be displayed by the projector device and, based on that determination, the identified portion of the content may be sent to the projector device. The projection instructions 210 and the e-ink display instructions 208 may work together to determine the appropriate manner in which to split the content between the projector device and the e-ink display device.

Figure 3:
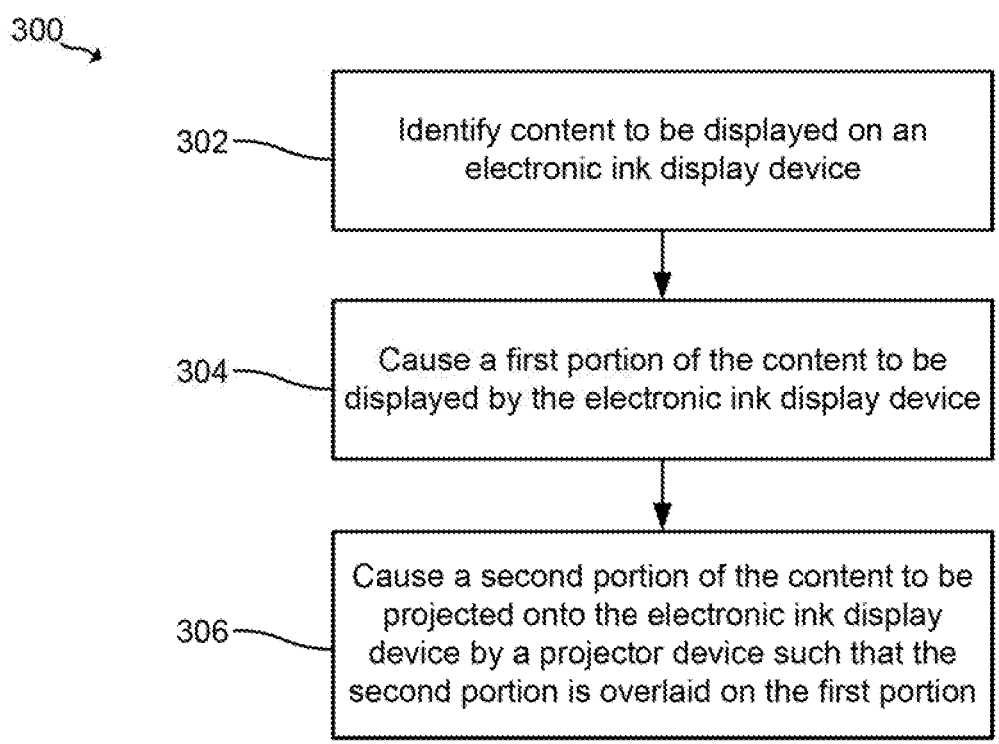
FIG. 3 is a flowchart of an example method for displaying content on an electronic ink display device and a projector device.

FIG. 3 is a flowchart of an example method 300 for displaying content on an e-ink display device and a projector device. Method 300 may be implemented using computing device 200 of FIG. 2.

Method 300 includes, at 302, identifying content to be displayed on an e-ink display device. The content may be identified and accessed in any suitable manner (e.g., over a network).

Method 300 also includes, at 304, causing a first portion of the content to be displayed by the e-ink display device. The first portion of the content may be the portion of the content that is to be displayed by the e-ink display device. The first portion of the content may be identified and sent to the e-ink display device such that the e-ink display device may display the first content.

Method 300 also includes, at 306, causing a second portion of the content to be projected onto the e-ink display device by a projector device such that the second portion is overlaid on the first portion. The second portion of the content may be the portion of the content that is to be projected by the projector device. The second portion of the content may be identified and sent to the projector device such that the projector device may project the second content onto the first content being displayed by the e-ink display device.

Examples provided herein (e.g., methods) may be implemented in hardware, software, or a combination of both. Example systems may include a controller/processor and memory resources for executing instructions stored in a tangible non-transitory medium (e.g., volatile memory, non-volatile memory, and/or machine-readable media). Non-transitory machine-readable media can be tangible and have machine-readable instructions stored thereon that are executable by a processor to implement examples according to the present disclosure.

An example system can include and/or receive a tangible non-transitory machine-readable medium storing a set of machine-readable instructions (e.g., software). As used herein, the controller/processor can include one or a plurality of processors such as in a parallel processing system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, and the like.

What is claimed is:

1. A system, comprising:
   an electronic ink display device to display first content; and
   a projector device to project second content onto the electronic ink display device such that the second content is overlaid on the first content, wherein:
   the projector device projects white light on the electronic ink display device when the projector device and the electronic ink display device are operating in a dark environment such that the first content and the second content are readable in the dark environment; and
   the projector device includes a camera to detect a position of the electronic ink display device relative to the projector device to align the second content displayed by the projector device onto the first content displayed by the electronic ink display device.

2. The system of claim 1, wherein the electronic ink display device is in communication with the projector device wirelessly or through a wired connection.

3. The system of claim 1, wherein the electronic ink display device and the projector device are separate devices or are included in one device.

4. The system of claim 1, wherein the first content is associated with the second content.

5. The system of claim 1, further comprising:
a processor in communication with the electronic ink display device and the projector device, wherein the processor is to send the first content to the electronic ink display device and wherein the processor is to send the second content to the projector device.

6. The system of claim 5, wherein the processor is further to coordinate a display of the first content with a display of the second content.

7. A method, comprising:
identifying, by a computing device, content to be displayed on an electronic ink display device;
causing, by the computing device, a first portion of the content to be displayed by the electronic ink display device; and
causing, by the computing device, a second portion of the content to be projected onto the electronic ink display device by a projector device such that the second portion of the content is overlaid on the first portion of the content, wherein:
the projector device projects white light on the electronic ink display device when the projector device and the electronic ink display device are operating in a dark environment such that the first portion of the content and the second portion of the content are readable in the dark environment; and
a camera of the projector device detects a position of the electronic ink display device relative to the projector device to align the second portion of the content displayed by the projector device onto the first portion of the content displayed by the electronic ink display device.

8. The method of claim 7, wherein the electronic ink display device and the projector device are in communication with the computing device wirelessly or through a wired connection.

9. The method of claim 7, wherein the first portion of the content is associated with the second portion of the content.

10. The method of claim 7, further comprising:
coordinating, by the computing device, a display of the first portion of the content with a display of the second portion of the content.

11. A non-transitory machine-readable storage medium storing instructions that, when executed by a processor of a computing device, cause the computing device to:
access content to be displayed on an electronic ink display device;
send a first portion of the content to the electronic ink display device, wherein the electronic ink display device is to display the first portion of the content; and
send a second portion of the content to a projector device to project the second portion of the content onto the electronic ink display device such that the second portion of the content is overlaid on the first portion of the content, wherein:
the projector device projects white light on the electronic ink display device when the projector device and the electronic ink display device are operating in a dark environment such that the first portion of the content and the second portion of the content are readable in the dark environment; and
the projector device includes a camera to detect a position of the electronic ink display device relative to the projector device to align the second portion of the content displayed by the projector device onto the first portion of the content displayed by the electronic ink display device.

12. The non-transitory machine-readable storage medium of claim 11, wherein the electronic ink display device and the projector device are in communication with the computing device wirelessly or through a wired connection.

13. The non-transitory machine-readable storage medium of claim 11, wherein the first portion of the content is associated with the second portion of the content.

14. The non-transitory machine-readable storage medium of claim 11, wherein the electronic ink display device and the projector device are separate devices or are included in one device.

15. The non-transitory machine-readable storage medium of claim 11, wherein the instructions further cause the computing device to coordinate a display of the first portion of the content with a display of the second position of the content.

* * * * *